(12) United States Patent
Kim

(10) Patent No.: US 12,589,541 B2
(45) Date of Patent: Mar. 31, 2026

(54) APPARATUS FOR MANUFACTURING ZIPPER FOR BAG AND METHOD OF MANUFACTURING ZIPPER FOR BAG

(71) Applicant: DongbangLED Co., Ltd., Paju-si (KR)

(72) Inventor: Lee Nam Kim, Paju-si (KR)

(73) Assignee: DongbangLED Co., Ltd., Paju-si (KR)

( * ) Notice: Subject to any disclaimer, the term of this patent is extended or adjusted under 35 U.S.C. 154(b) by 68 days.

(21) Appl. No.: 18/825,790

(22) Filed: Sep. 5, 2024

(65) Prior Publication Data

US 2025/0205955 A1     Jun. 26, 2025

(30) Foreign Application Priority Data

Dec. 26, 2023   (KR) ......................... 10-2023-0191677

(51) Int. Cl.
| | |
|---|---|
| *B29C 48/155* | (2019.01) |
| *A44B 19/34* | (2006.01) |
| *B29C 48/00* | (2019.01) |
| *B29C 48/12* | (2019.01) |
| *B29C 48/13* | (2019.01) |
| *B29C 48/154* | (2019.01) |
| *B29C 48/88* | (2019.01) |
| *A45C 13/10* | (2006.01) |
| *B29K 55/02* | (2006.01) |
| *B29K 69/00* | (2006.01) |
| *B29K 105/00* | (2006.01) |
| *B29L 5/00* | (2006.01) |
| *B29L 31/00* | (2006.01) |

(52) U.S. Cl.
CPC ............ *B29C 48/155* (2019.02); *A44B 19/34* (2013.01); *B29C 48/0022* (2019.02); *B29C 48/12* (2019.02); *B29C 48/13* (2019.02); *B29C 48/154* (2019.02); *B29C 48/911* (2019.02);

*A45C 13/103* (2013.01); *B29K 2055/02* (2013.01); *B29K 2069/00* (2013.01); *B29K 2105/0088* (2013.01); *B29L 2005/00* (2013.01); *B29L 2031/727* (2013.01)

(58) Field of Classification Search
CPC ................................................ B29C 48/15–157
See application file for complete search history.

(56) References Cited

U.S. PATENT DOCUMENTS

| | | | | | |
|---|---|---|---|---|---|
| 3,608,035 | A | * | 9/1971 | Frohlich | ................ A44B 19/14 |
| | | | | | 264/172.19 |
| 2002/0121005 | A1 | * | 9/2002 | Dawson | ................ A44B 19/32 |
| | | | | | 24/384 |

FOREIGN PATENT DOCUMENTS

| | | | | |
|---|---|---|---|---|
| DE | 102020007940 A1 | * | 6/2022 | ......... B29C 66/7392 |
| JP | S50126604 U | | 10/1975 | |
| JP | S59232839 A | | 12/1984 | |

(Continued)

*Primary Examiner* — Atul P. Khare
(74) *Attorney, Agent, or Firm* — STIP Law Group, LLC

(57) ABSTRACT

The present disclosure is for the purpose of providing an apparatus for manufacturing a zipper for a bag in which the zipper is provided in an opening of the bag of a hard type, which is made of a synthetic resin or aluminum, while being connected to a frame when extruding the frame, thus eliminating a need to sew or adhesively fix the zipper to the frame molded as in the related art, minimizing manufacturing operations, improving a manufacturing efficiency, enhancing the quality of the bag by firmly connecting the zipper to the frame, and sufficiently ensuring user's satisfaction, and a method of manufacturing the zipper for the bag.

8 Claims, 10 Drawing Sheets

(56)          References Cited

FOREIGN PATENT DOCUMENTS

| JP | H06122151 | A |   | 5/1994 | | |
|----|-----------|---|---|--------|---|---|
| JP | 2010143152 | A |   | 7/2010 | | |
| JP | 2011182853 | A | * | 9/2011 | | |
| JP | 3196865 | U | * | 4/2015 | ........... | A45C 13/103 |
| KR | 200231364 | Y1 |   | 7/2001 | | |
| KR | 101246347 | B1 |   | 3/2013 | | |
| KR | 101423662 | B1 |   | 7/2014 | | |
| KR | 102032763 | B1 |   | 11/2019 | | |
| KR | 200345061 | Y1 |   | 3/2024 | | |

* cited by examiner

FIG. 12

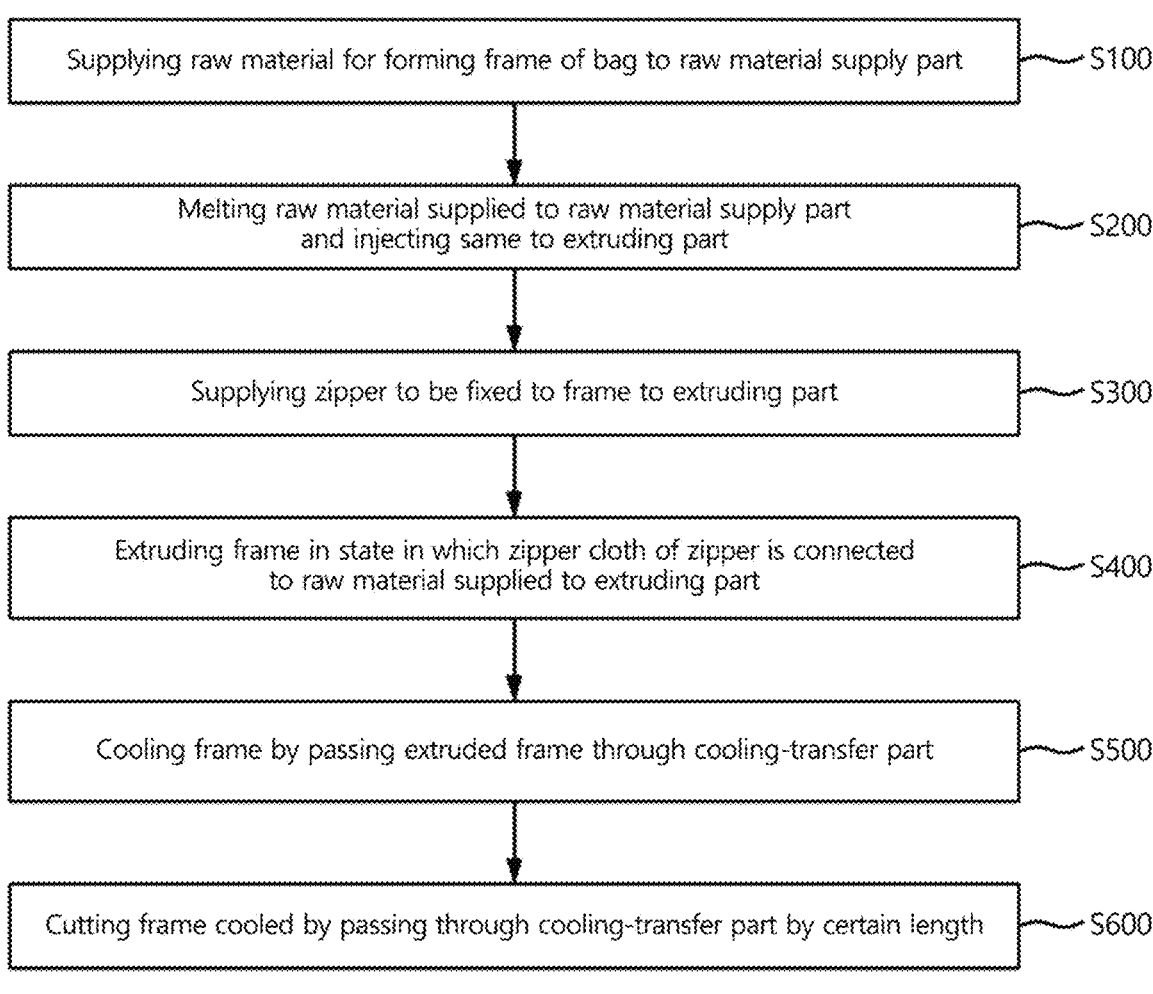

Supplying raw material for forming frame of bag to raw material supply part    S100

Melting raw material supplied to raw material supply part
and injecting same to extruding part    S200

Supplying zipper to be fixed to frame to extruding part    S300

Extruding frame in state in which zipper cloth of zipper is connected
to raw material supplied to extruding part    S400

Cooling frame by passing extruded frame through cooling-transfer part    S500

Cutting frame cooled by passing through cooling-transfer part by certain length    S600

APPARATUS FOR MANUFACTURING ZIPPER FOR BAG AND METHOD OF MANUFACTURING ZIPPER FOR BAG

CROSS-REFERENCE TO RELATED APPLICATIONS

This application claims the priority of the Korean Patent Applications NO 10-2023-0191677, filed on Dec. 26, 2023, in the Korean Intellectual Property Office. The entire disclosures of all these applications are hereby incorporated by reference.

TECHNICAL FIELD

The present disclosure relates to an apparatus for manufacturing a zipper for a bag and a method of manufacturing the zipper for the bag, and more particularly to an apparatus for manufacturing a zipper for a bag and a method of manufacturing the zipper for the bag, in which a frame for connecting a zipper is molded together with the zipper during extrusion so that convenient manufacturing is provided and the zipper may be firmly connected.

BACKGROUND

In general, a travelling bag is designed to easily package various clothes or various personal effects for a long-distance travel such as a domestic travel or an overseas travel. In addition to such clothes or personal effects, souvenirs purchased at travel destinations may be accommodated in the bag, which increases the volume of contents to be accommodated in the bag. That is, typically, the volume of contents accommodated in the bag increases at the end of the travel rather than at the beginning of the travel, so that the volume of the bag also increases.

FIG. 1 is a perspective view of a general travelling bag. A general travelling bag 1 includes a body 2 formed in a rectangular shape and having an accommodation space 2a in which books, clothes or the like are accommodated, a zipper 4 provided between the body 2 and a periphery of a cover 3 to open and close the accommodation space 2a, moving wheels 5 provided in a lower end portion of the body 2, and a carrying handle 6 provided in an upper end portion of the body 2. With this configuration, a user may easily drag and move the travelling bag 1.

As illustrated in FIG. 2, in the zipper 4 applied to the travelling bag 1, zipper cloths 4a are sewed to inner sides of the body 2 and the cover 3 of the travelling bag 1, which are separated from each other, teeth 4b and 4b' are respectively formed in the zipper clothes 4a to be engaged with each other, and a slider 4c with a handle 4d on an upper surface thereof moves along the teeth 4b and 4b' to separate or coupled the zipper clothes 4a from each other or to each other.

In such a configuration of the zipper 4 in the related art, when pressure is applied inward of the bag, as illustrated in FIG. 3, the zipper clothes 4a are likely to be folded so that the bag may be crushed. As such a situation often occurs, the zipper clothes 4a are easily damaged and consequently easily separated from the body 2 and the cover 3. This makes it difficult to keep the original condition of the bag for a long period of time.

In addition, in a case in which the body 2 and the cover 3 of the bag 1 to which the zipper 4 is connected are made of a synthetic resin or a metal material, the zipper 4 needs to be fixed to the body 2 and the cover 3 with an adhesive or the like. An adhesive force applied between the zipper 4 and the body 2 and the cover 3 becomes weak over time. As a result, the zipper 4 is prone to be torn even with little force.

DOCUMENT IN RELATED ART

Patent Document

Patent Document 1: Korean Utility Model Registration No. 20-0345061 (Mar. 18, 2024)

SUMMARY

The present disclosure was made to solve the above-mentioned matters, and the present disclosure is for the purpose of providing an apparatus for manufacturing a zipper for a bag in which the zipper is provided in an opening of the bag of a hard type, which is made of a synthetic resin or aluminum, while being connected to a frame when extruding the frame, thus eliminating a need to sew or adhesively fix the zipper to the frame molded as in the related art, minimizing manufacturing operations, improving a manufacturing efficiency, enhancing the quality of the bag by firmly connecting the zipper to the frame, and sufficiently ensuring user's satisfaction, and a method of manufacturing the zipper for the bag.

According to an example embodiment of the present disclosure, an apparatus for manufacturing a zipper for a bag may include a raw material supply part configured to supply a raw material for forming a frame having an opening of the bag, an extruding part configured to extrude the frame with the raw material supplied from the raw material supply part, a zipper supply part configured to supply the zipper to the extruding part such that the zipper is fixed to the frame to be extruded by the extruding part, and a cooling-transfer part configured to cool and transfer the frame extruded together with the zipper by the extruding part.

In an aspect, the extruding part may include a feeding mold to which the raw material of the frame and the zipper are supplied, a shaping mold connected to the feeding mold and configured to sandwich the zipper into the raw material transferred via the feeding mold, and an extruding mold connected to the shaping mold and configured to extrude the frame with the zipper fixed to the frame.

In an aspect, the feeding mold may have raw material injection ports to each of which the raw material of the frame is injected, and a zipper introduction port into which the zipper is introduced.

In an aspect, the zipper introduction port may be formed between the raw material injection ports such that the zipper is fitted into and fixed to the frame.

In an aspect, the shaping mold may be connected to the raw material injection port and the zipper introduction port such that the zipper introduced into the zipper introduction port is sandwiched into the raw material injected to the raw material injection port.

In an aspect, the extruding mold may have an extruding port formed to discharge the frame which is extruded while a zipper cloth is fitted into the raw material discharged from the shaping mold and the zipper is fixed to the frame.

According to another example embodiment of the present disclosure, a method of manufacturing a zipper for a bag may include (a) supplying a raw material for forming a frame of the bag to a raw material supply part, (b) melting the raw material supplied to the raw material supply part and injecting the melted raw material to an extruding part, (c) supplying a zipper to the extruding part such that the zipper is fixed to the frame, (d) extruding the frame in a state in which a zipper cloth of the zipper is connected to the melted raw material supplied to the extruding part, and (e) cooling the frame with the zipper fixed thereto by passing the frame through a cooling-transfer part.

In an aspect, the method may further include (f) cutting the frame, which has passed through the cooling-transfer part, by a certain length.

In addition, in the act (c) of supplying the zipper to the extruding part, the zipper cloth may be supplied while being sandwiched into the raw material injected to the extruding part.

In an aspect, in the act (d) of extruding the frame, the frame may be extruded by the extruding part in a state in which the zipper cloth of the zipper is positioned inward of the raw material and the zipper is fixed to the frame.

As described above, according to an example embodiment of the present disclosure, a raw material such as a synthetic resin or aluminum is injected and simultaneously, a zipper for opening and closing a bag is supplied such that a zipper cloth of the zipper is sandwiched into the raw material. In this state, a frame to which the zipper is connected is extruded. This makes it possible to firmly connect the zipper to the frame during the extrusion, thus preventing the zipper from being torn, enhancing the quality of the bag, and maximizing user' satisfaction.

BRIEF DESCRIPTION OF THE DRAWINGS

FIG. 12 is a flow chart illustrating a method of manufacturing a zipper for a bag according to the present disclosure.

DETAILED DESCRIPTION

Hereinafter, preferred example embodiments of the present disclosure will be described in detail with reference to the accompanying drawings. Features and advantages of the present disclosure, and means for implementing them will become more apparent by the preferred example embodiments of the present disclosure, which will be described in detail with reference to the accompanying drawings. However, the example embodiments of the present disclosure described below are merely exemplary and are not intended to limit the scope of the present disclosure to only the described example embodiments. Further, constituent elements of the example embodiments may be appropriately combined to each other to the extent that they are not contradictory, unless otherwise specified.

Further, when a part "comprises or includes" a constituent element through the specification, this means that the part may further include other constituent elements, rather than excluding other constituent elements, unless other stated.

Further, when one constituent element is referred to as being "connected" to another constituent element, the one constituent element may be "directly connected" to another constituent element, or may be "indirectly connected" or "electrically connected" to another constituent element by intervening yet another constituent element therebetween.

In the descriptions of the example embodiments, the expression that a layer (film), region, pattern or structure is formed "on (above)" or "below (under)" a substrate, another layer (film), region, pad, or pattern should be understood as encompassing that the layer (film), region, pattern or structure may be directly formed on the substrate, another layer (film), region, pad, or pattern, or may be formed on the substrate, another layer (film), region, pad, or pattern by intervening yet another layer therebetween. The meaning of "on (above)" or "below (under)" will be described with reference to the drawings.

Further, the terms a "first," a "second," and the like are used to distinguish a plurality of constituent elements, and the order or importance of corresponding constituent elements is not limited by these terms.

Figure 1:
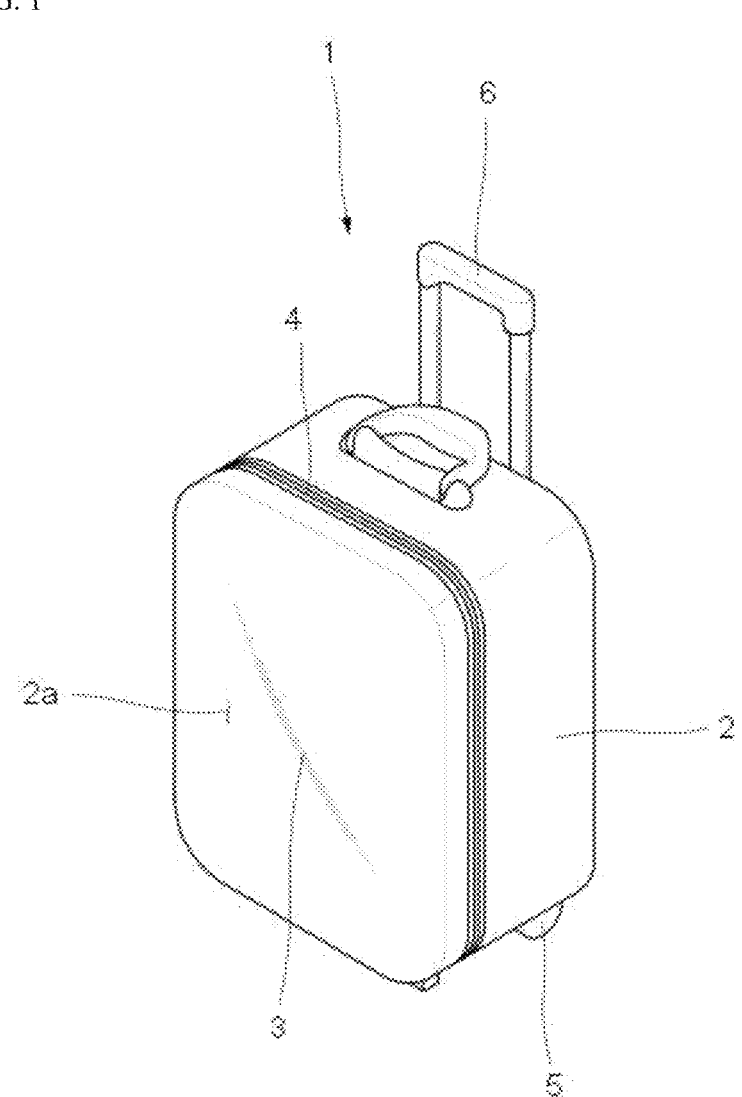
FIG. 1 is a perspective view of a general travelling bag.
Figure 2:
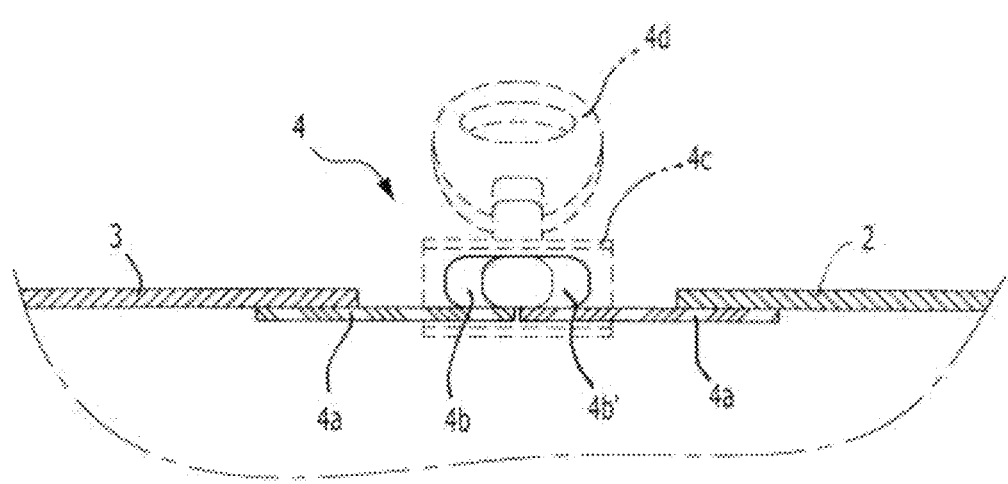
FIG. 2 is a cross-sectional view of a zipper for a bag in the related art.
Figure 3:
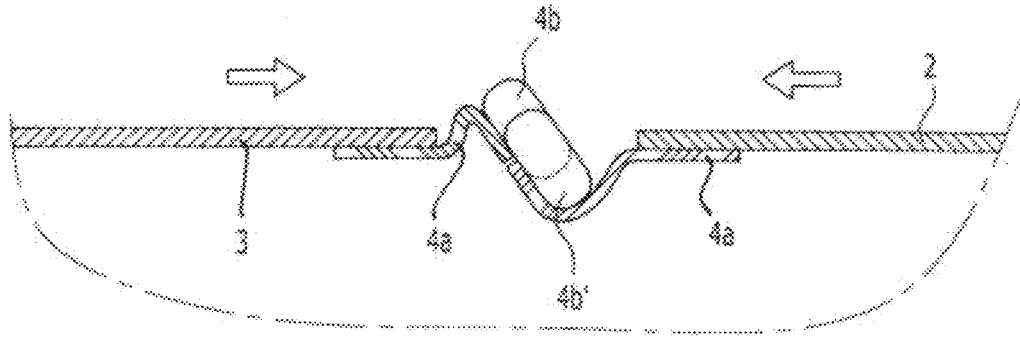
FIG. 3 is a cross-sectional view illustrating a state in which the zipper for the bag in the related art is crushed by an external pressure.
Figure 4:
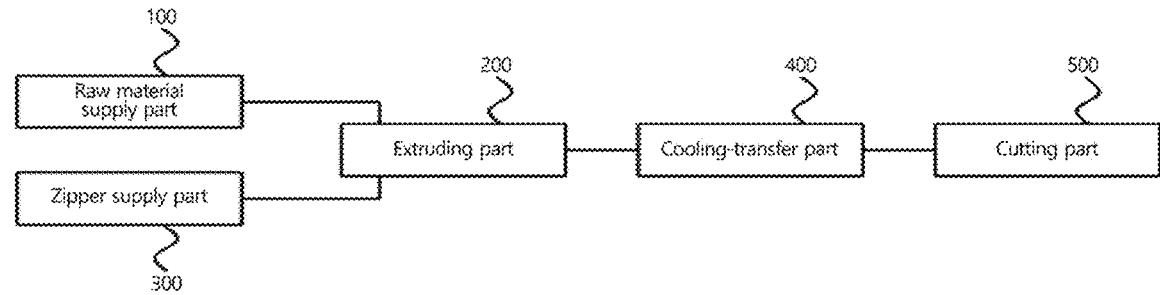
FIG. 4 is a configuration diagram of an apparatus for manufacturing a zipper for a bag according to the present disclosure.
Figure 5:
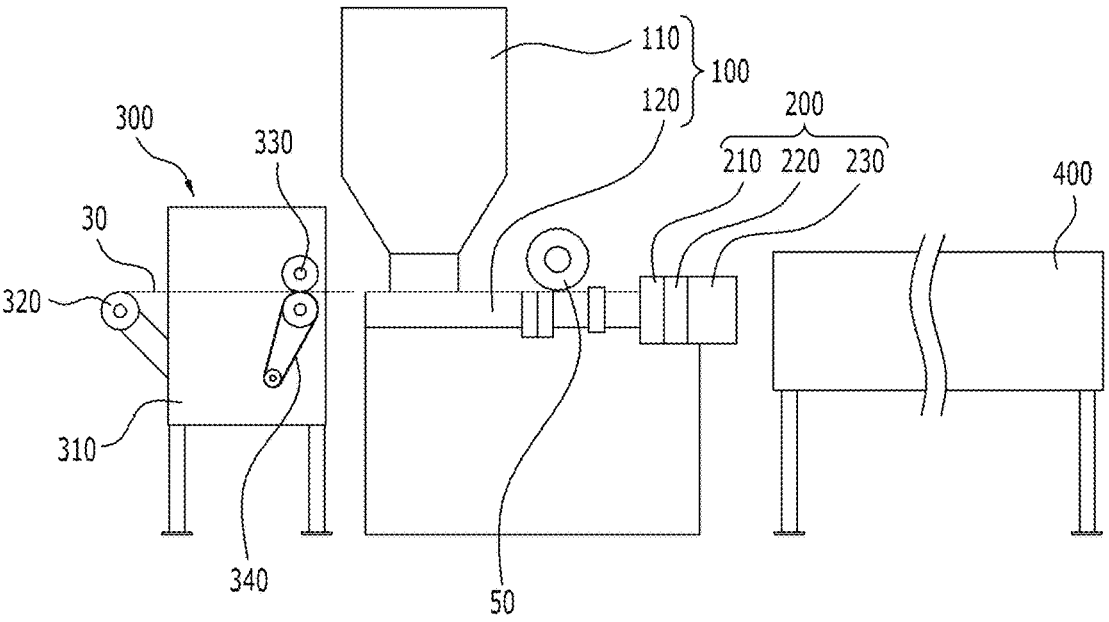
FIG. 5 is a front view of the apparatus for manufacturing a zipper for a bag according to the present disclosure.
Figure 6:
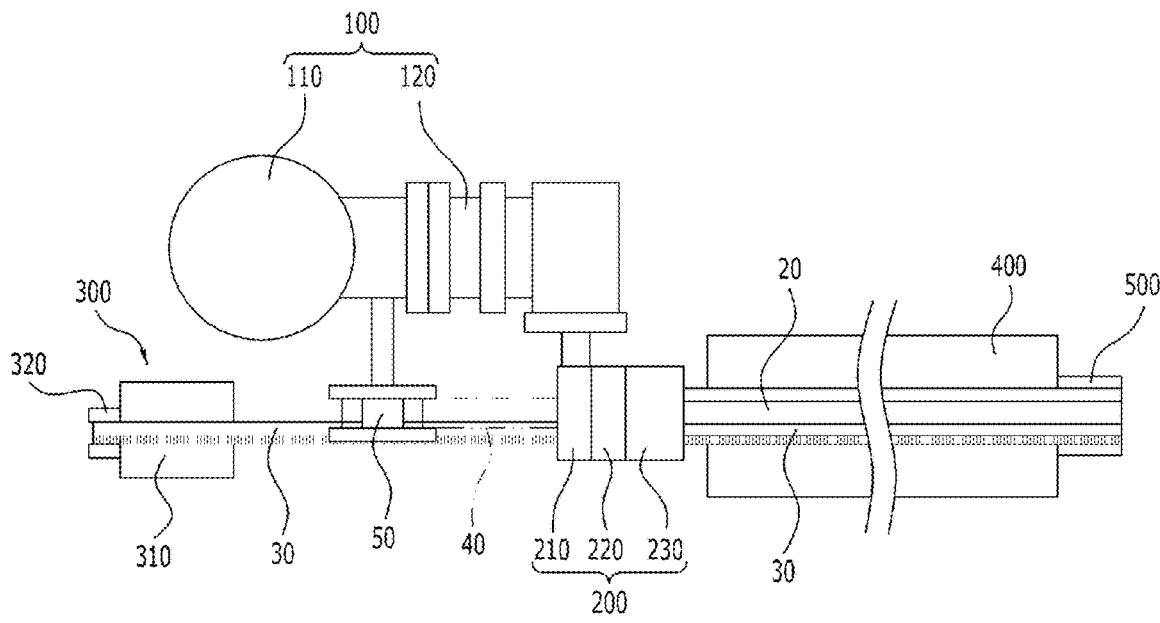
FIG. 6 is a plan view of the apparatus for manufacturing a zipper for a bag according to the present disclosure.
Figure 7:
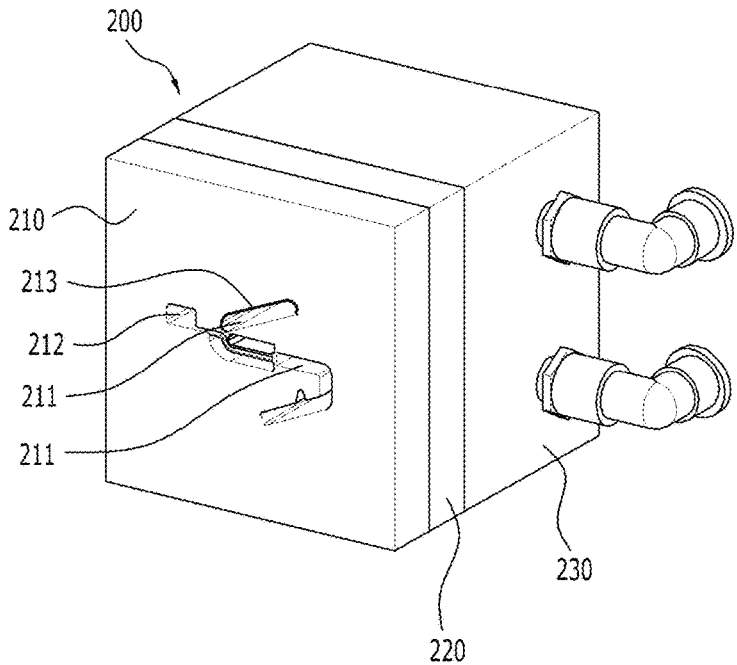
FIG. 7 is a perspective view of an extruding part of the apparatus for manufacturing a zipper for a bag according to the present disclosure.
Figure 8:
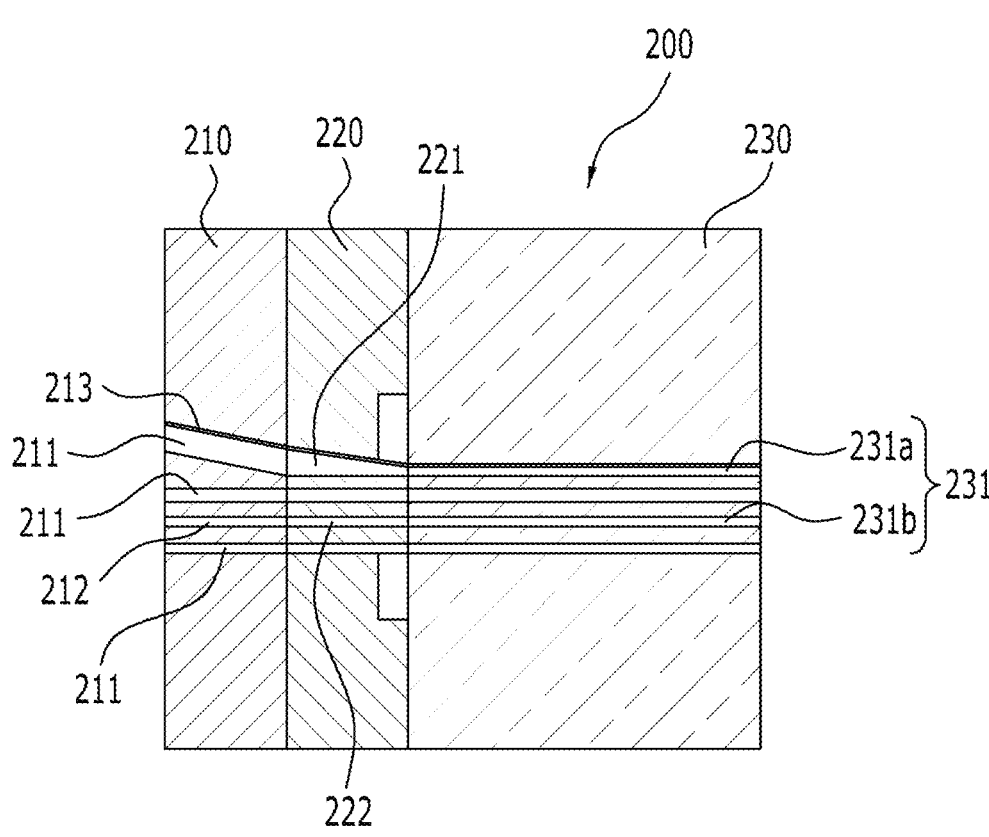
FIG. 8 is a cutaway cross-sectional view of the extruding part of the apparatus for manufacturing a zipper for a bag according to the present disclosure.
Figure 9:
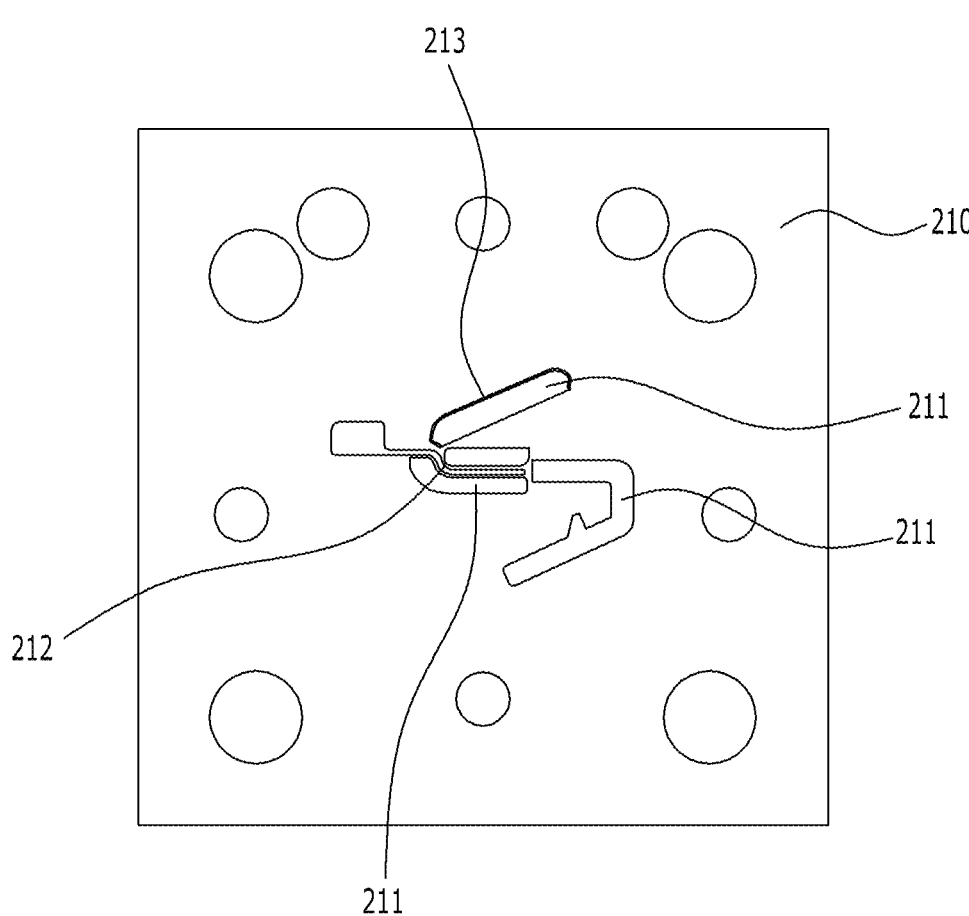
FIG. 9 is a side view of a feeding mold of the extruding part of FIG. 7.
Figure 10:
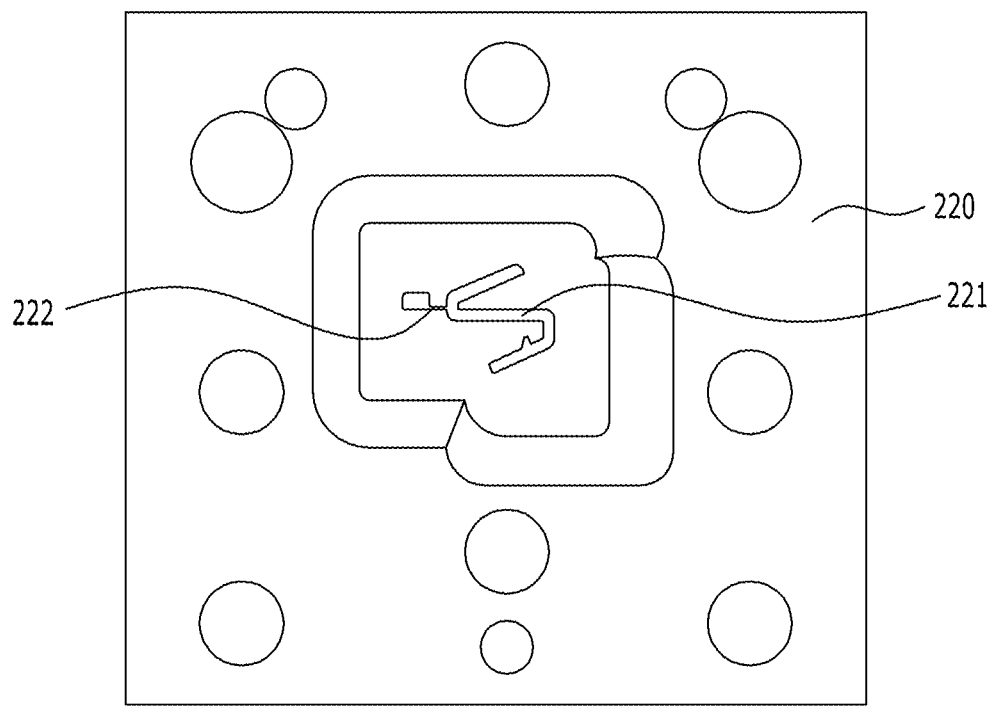
FIG. 10 is a side view of a shaping mold of the extruding part of FIG. 7.
Figure 11:
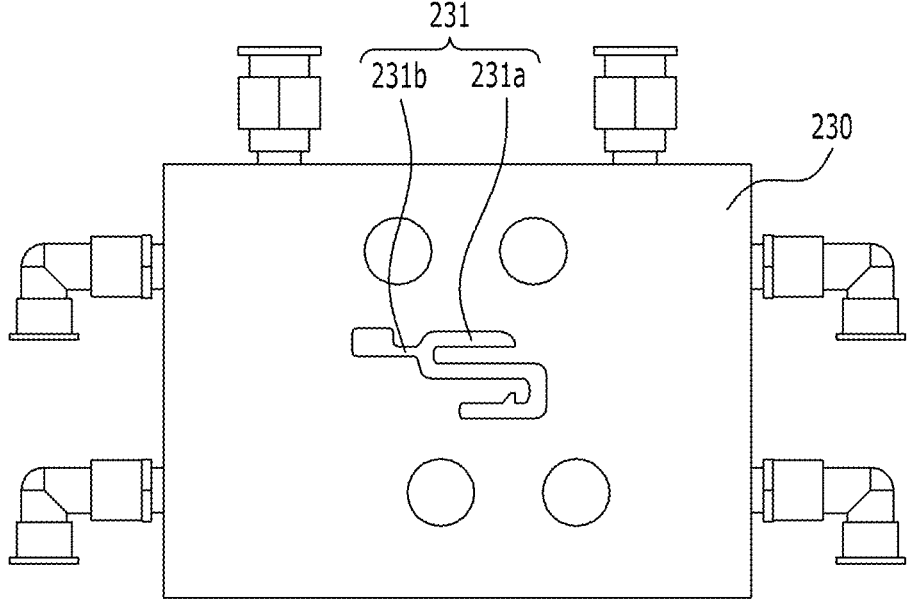
FIG. 11 is a side view of an extruding mold of the extruding part of FIG. 7.
Figure 13:
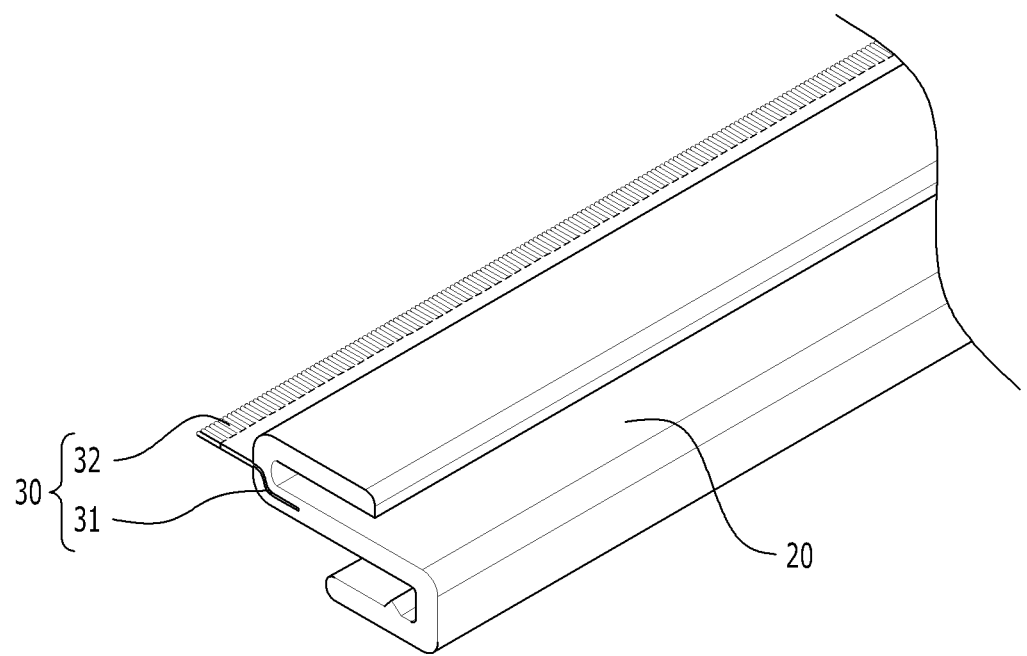
FIG. 13 is a perspective view of a frame extruded together with the zipper manufactured by the apparatus and method according to the present disclosure.
Figure 14:
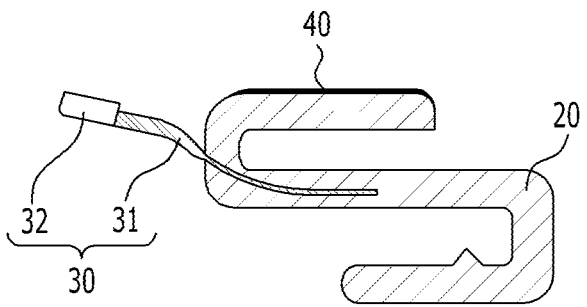
FIG. 14 is a cross-sectional view of the frame extruded together with the zipper manufactured by the apparatus and method according to the present disclosure.
Figure 15:
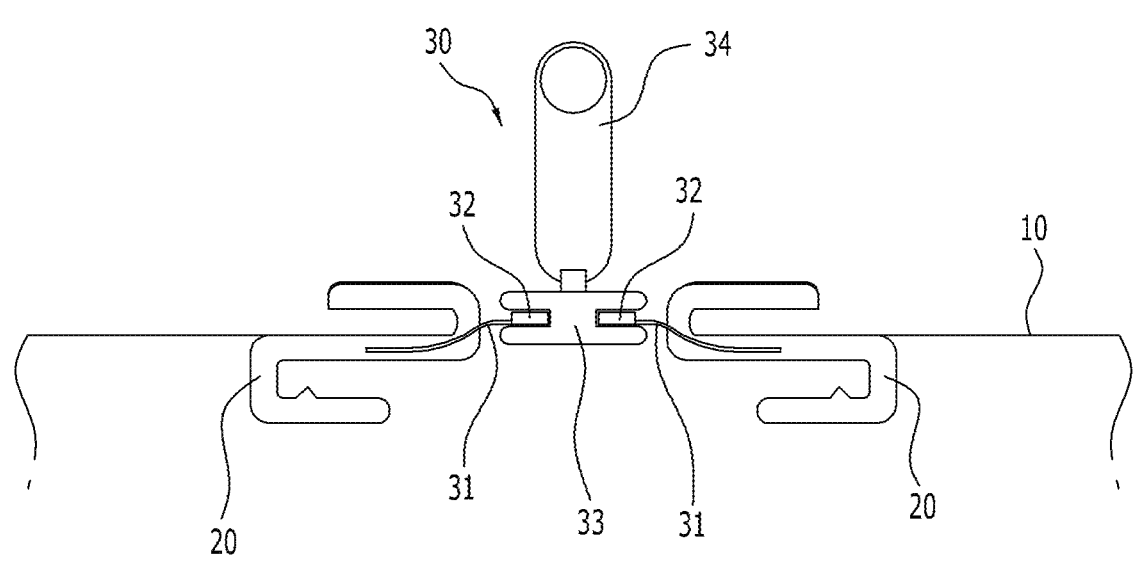
FIG. 15 is a front view illustrating a connection state of the zipper manufactured by the apparatus and method according to the present disclosure.

FIG. 4 is a configuration diagram of an apparatus for manufacturing a zipper for a bag according to the present disclosure. FIG. 5 is a front view of the apparatus for manufacturing a zipper for a bag according to the present disclosure. FIG. 6 is a plan view of the apparatus for manufacturing a zipper for a bag according to the present disclosure. FIG. 7 is a perspective view of an extruding part of the apparatus for manufacturing a zipper for a bag according to the present disclosure. FIG. 8 is a cutaway cross-sectional view of the extruding part of the apparatus for manufacturing a zipper for a bag according to the present disclosure. FIG. 9 is a side view of a feeding mold of the extruding part of FIG. 7. FIG. 10 is a side view of a shaping mold of the extruding part of FIG. 7. FIG. 11 is a side view of an extruding mold of the extruding part of FIG. 7. FIG. 12 is a flow chart illustrating a method of manufacturing a zipper for a bag according to the present disclosure. FIG. 13 is a perspective view of a frame extruded together with the zipper manufactured by the apparatus and method according to the present disclosure. FIG. 14 is a cross-sectional view of the frame extruded together with the zipper manufactured by the apparatus and method according to the present disclosure. FIG. 15 is a front view illustrating a connection state of the zipper manufactured by the apparatus and method according to the present disclosure.

As illustrated in FIGS. 4 to 6, the apparatus for manufacturing a zipper for a bag according to the present disclosure may include a raw material supply part 100, an extruding part 200, a zipper supply part 300, a cooling-transfer part 400, and a cutting part 500.

The raw material supply part 100 supplies a raw material used to extrude a frame 20 having an opening of the bag 10. In this case, examples of the raw material of the frame 20 may include at least one synthetic resin selected from a group consisting of polycarbonate (PC), acrylonitrile butadiene styrene (ABS), polypropylene (PP), polyurethane (PU) and the like, or aluminum (Al). More preferably, the raw material of the frame 20 may be a mixture of PC and ABS.

Further, the mixture of PC and ABS, which is used as the raw material of the frame 20, may be obtained by mixing 6 to 7 parts by weight of PC with 3 to 4 parts by weight of ABS. The higher the specific gravity of PC, the higher the strength.

Further, in the raw material of the frame 20, a melting temperature of PC is about 250 to 260 degrees C. (Celsius), and a melting temperature of ABS is about 180 degrees C. A melting temperature of the mixture of PC and ABS is about 220 to 230 degrees C. A melting temperature of a zipper cloth 31 is about 260 degrees C. or more. Thus, in the present disclosure, when the frame 20 using the mixture of PC and ABS as the raw material thereof is extruded by the extruding part 200, the zipper cloth 31 may be sandwiched into and fixed to the frame 20 without being melted.

Referring to FIGS. 4 and 5, the raw material supply part 100 may include a raw material storage hopper 110 in which the raw material is stored, and a raw material supplier 120 connected to the raw material storage hopper 110 and configured to melt the raw material stored in the raw material storage hopper 110 and supply the same to the extruding part 200. In this case, a configuration and operational principle of the raw material supplier 120 has been widely known in an extruding machine in the related art, and therefore detailed description thereof is omitted.

The extruding part 200 is connected to the raw material supply part 100 to extrude the raw material supplied from the raw material supply part 100 into the frame 20.

Referring to FIGS. 7 and 8, the extruding part 200 may include a feeding mold 210, a shaping mold 220, and an extruding mold 230.

Referring to FIG. 9, the feeding mold 210 may be connected to the raw material supply part 100 to receive the raw material such as a synthetic resin or aluminum and receive a zipper 30 from the zipper supply part 300. In this case, the zipper cloth 31 of the zipper 30 may be positioned inward of the raw material supplied to the feeding mold 210.

Further, referring to FIG. 8, the feeding mold 210 may have a raw material injection port 211 into which the synthetic resin is injected as the raw material. The raw material injection port 211 may be formed to penetrate through the extruding part 200 in a forward and backward direction.

Further, the raw material injection port 211 may include at least one or more raw material injection ports 211. Different raw materials may be injected to the raw material injection ports 211 such that the frame 20 to be extruded has various colors or the like.

Further, the feeding mold 210 may have a zipper introduction port 212 into which the zipper 30 is introduced from the zipper supply part 300. In this case, as illustrated in FIG. 9, the zipper introduction port 212 may be formed between the raw material injection ports 211 such that the zipper cloth 31 of the zipper 30 is sandwiched into and fixed to the frame 20.

Further, the raw material injection ports 211 may have a film introduction port 213 into which a film 40 wound on a film roller 50 is introduced. A surface of the frame 20 is coated with the film 40. As illustrated in FIG. 14, when the synthetic resin as the raw material is injected and extruded, the film 40 is supplied to the film introduction port 213 to be coated on the surface of the frame 20. In this case, the film 40 coated on the surface of the frame 20 may have various colors and patterns.

The shaping mold 220 may be connected to the feeding mold 210 to guide the raw material injected from the raw material supply part 100 and the zipper 30 supplied from the zipper supply part 300 such that the zipper 30 is sandwiched into the raw material.

Referring to FIG. 10, in the shaping mold 220, a raw material injection port 221 and a zipper introduction port 222 may be connected to each other such that the zipper cloth 31 introduced via the zipper introduction port 212 is sandwiched into the raw material injected to the raw material injection ports 211 of the feeding mold 210 and the zipper 30 is fixed to the frame 20 to be extruded. Thus, when the frame 20 is extruded with the raw material injected to the raw material injection port 221, the zipper cloth 31 may be sandwiched into and fixed to the frame 20.

The extruding mold 230 may be connected to the shaping mold 220 and configured to extrude the frame 20 in the state in which the zipper cloth 31 of the zipper 30 is fixed to the frame 20.

Referring to FIG. 11, the extruding mold 230 may have an extruding port 231. While the zipper cloth 31 is sandwiched into the raw material discharged from the shaping mold 220, the frame 20 to which the zipper 30 is fixed may be extruded via the extruding port 231. Further, the extruding port 231 may include a raw material injection port 231a and a zipper introduction port 231b connected to each other. The raw material injection port 231a may be formed to have the same cross-sectional shape as that of the frame 20.

The zipper supply part 300 supplies the zipper 30 to the extruding part 200 such that the zipper 30 is fixed to the frame 20 to be extruded. Referring to FIG. 15, the zipper 30 may include zipper cloths 31 fixed to both frames 20. Teeth 32 are attached to each of the zipper cloths 31. The zipper 30 may include a slider 33 configured to move forward or backward along the teeth 32 such that the teeth 32 attached to each of the zipper cloths 31 are engaged or separated with or from each other. The slider 33 includes a handle 34.

Referring to FIGS. 5 and 6, the zipper supply part 300 may include a support frame 310 provided on a side of the extruding part 200, a winding roller 320 connected to the support frame 310 to wind the zipper 30, a transfer roller 330 connected to the support frame 310 so as to transfer the zipper 30 wound on the winding roller 320 to the extruding part 200, and a driving belt 340 connected to the transfer roller 330 to rotate the transfer roller 330 such that the zipper 30 is transferred. In this case, the driving belt 340 may be connected to a motor (not illustrated) and be rotated with the driving of the motor.

The cooling-transfer part 400 cools and transfers the frame 20 extruded together with the zipper 30 by the extruding part 200. Further, an interior of the cooling-transfer part 400 may be filled with cooling water for cooling the extruded frame 20.

The cutting part 500 is connected to the cooling-transfer part 400 to cut the frame 20 equipped with the zipper 30, which has been cooled and transferred, by a certain length.

The zipper cloth 31 is sandwiched into the frame 20 extruded by the aforementioned extruding part 200. This prevents the zipper 30 from being separated or stripped from the frame 20.

Further, the frame 20 equipped with the zipper 30, which is extruded by the extruding part 200 and cooled by the cooling-transfer part 400, may be manufactured to have a length of about 1.5 to 2 meters (m) per minute. In a case in which the frame 20 is extruded to have a length of 1.5 m or less per minute, productivity may be degraded and the extruding operation may not be smoothly performed in a desired shape due to high heat of the extruding part 200. In a case in which the frame 20 is extruded to have a length of 2 m or more per minute, the cooling operation of the cooling-transfer part 400 may not be smoothly performed, which may cause poor quality.

As illustrated in FIG. 12, a method of manufacturing a zipper for a bag according to one example embodiment of the present disclosure includes (a) supplying, to the raw material supply part 100, a raw material used to extrude the frame 20 having an opening of a bag 10 (S 100). In this case, examples of the raw material may include at least one synthetic resin selected from a group consisting of polycarbonate (PC), acrylonitrile butadiene styrene (ABS), polypropylene (PP), polyurethane (PU) and the like, or aluminum (Al).

Further, the method includes (b) melting the raw material supplied from the raw material supply part 100 and injecting the same to the extruding part 200 (S200).

Further, the method includes (c) supplying the zipper 30 to the extruding part 200 while the raw material is injected to the extruding part 200 (S300).

The raw material is injected to the raw material injection port 211 of the extruding part 200 and the zipper 30 is introduced into the zipper introduction port 212 so that the zipper cloth 31 is sandwiched into the raw material injected to the extruding part 200.

Further, the method includes (d) extruding the frame 20 in a state in which the zipper cloth 31 of the zipper 30 is connected to the raw material supplied to the extruding part 200 and the zipper 30 is fixed to the frame 20 (S400).

The raw material and the zipper 30 are supplied to the feeding mold 210 of the extruding part 200 and pass through the extruding mold 230 for extruding the frame 20. At this time, the frame 20 is extruded in the state in which the zipper cloth 31 is sandwiched into the raw material. Thus, the zipper cloth 31 is sandwiched into the frame 20 so that the zipper 30 is fixed to the frame 20.

Further, the method includes (e) passing the frame 20, which is extruded while the zipper 30 is fixed to the frame 20, through the cooling-transfer part 400 to cool the frame 20 (S500). The cooling-transfer part 400 may be filled with cooling water. The extruded frame 20 is transferred while being immersed in the cooling water, which increases cooling efficiency.

Further, the method includes (f) cutting, by a certain length, the frame 20 to which the zipper 30 is fixed and which is cooled by the cooling-transfer part 400 (S600).

As described above, according to the present disclosure, when the raw material supplied from the raw material supply part 100 are introduced into the extruding part 200 to extrude the frame 20 to which the zipper 30 for opening the interior of the bag 10 is connected, the zipper 30 is supplied inward of the raw material injected to the extruding part 200.

Subsequently, the frame 20 is extruded by the extruding part 200 simultaneously with the supply of the zipper 30 so that the zipper cloth 31 is fitted into the frame 20.

Accordingly, the frame 20 is extruded in the state in which the zipper 30 is fixed to the frame 20. This eliminates a need to perform an additional operation of sewing the zipper to the frame or fixing the zipper to the frame with an adhesive, which has been performed in the related art. Thus, the operation of fixing the zipper 30 to the frame 20 is facilitated.

Further, the frame 20 is extruded in the state in which the zipper cloth 31 is sandwiched into the frame 20, which prevents the zipper cloth 31 from being separated or stripped from the frame 20 due to external strong shock. This improves the quality of the bag 10 and allows the bag 10 to be used for a long period of time.

Although specific example embodiments have been described in the detailed description of the present disclosure, the present disclosure should not be interpreted as being limited to example embodiments described herein. The present disclosure should be understood as including various modifications, equivalents and alterations without departing from the sprit and scope of the present disclosure defined by the appended claims.

In other words, the present disclosure is not limited to the above-described specific example embodiments and the above descriptions, various modifications may be made by a person of ordinary skill in the art without departing from the scope and technical spirit of the present disclosure. Of course, such modifications also belong to the scope of the present disclosure.

| EXPLANATION OF REFERENCE NUMERALS | |
| --- | --- |
| 10: Bag | 20: Frame |
| 30: Zipper | 31: Zipper cloth |
| 32: Teeth | 33: Slider |
| 34: Handle | 40: Film |
| 50: Film roller | 100: Raw material supply part |
| 110: Raw material storage hopper | 120: Raw material supplier |
| 200: Extruding part | 210: Feeding mold |
| 211, 221, 231a: Raw material injection port | |
| 212, 222, 231 b: Zipper introduction port | |
| 213: Film introduction port | 220: Shaping mold |
| 230: Extruding mold | 231: Extruding port |
| 300: Zipper supply part | 310: Support frame |
| 320: Winding roller | 330: Transfer roller |
| 340: Driving belt | 400: Cooling-transfer part |
| 500: Cutting part | |

What is claimed is:

1. An apparatus for manufacturing a zipper for a bag, comprising:

a raw material supply part configured to supply a raw material for forming a frame having an opening of the bag;

an extruding part configured to extrude the raw material supplied from the raw material supply part;

a zipper supply part configured to supply the zipper to the extruding part such that the zipper is fixed to the frame to be extruded by the extruding part; and a cooling-transfer part configured to cool and transfer the frame extruded together with the zipper by the extruding part, wherein the extruding part includes:

a feeding mold to which the raw material of the frame and the zipper are supplied;

a shaping mold connected to the feeding mold and configured to sandwich a cloth of the zipper into the raw material transferred via the feeding mold; and an extruding mold connected to the shaping mold and configured to extrude the frame with the zipper fixed to the frame.

2. The apparatus of claim 1, wherein the feeding mold has raw material injection ports to each of which the raw material of the frame is injected and a zipper introduction port into which the zipper cloth is introduced.

3. The apparatus of claim 2, wherein the zipper introduction port is formed between the raw material injection ports such that the zipper is fitted into and fixed to the frame.

4. The apparatus of claim 2, wherein the shaping mold is connected to the raw material injection port and the zipper introduction port such that the zipper cloth introduced into the zipper introduction port is sandwiched into the raw material injected to the raw material injection port.

5. The apparatus of claim 1, wherein the extruding mold has an extruding port formed to discharge the frame which is extruded while the zipper cloth is fitted into the raw material discharged from the shaping mold and the zipper is fixed to the frame.

6. A method of manufacturing a zipper for a bag, the method comprising:

(a) supplying a raw material for forming a frame of the bag to a raw material supply part;

(b) melting the raw material supplied to the raw material supply part and injecting the melted raw material to a feeding mold of an extruding part;

(c) supplying a zipper to the feeding mold of the extruding part such that the zipper is fixed to the frame;

(d) extruding the frame with an extruding mold of the extruding part in a state in which a zipper cloth of the zipper is connected to the melted raw material supplied to the extruding part; and (e) cooling the frame with the zipper fixed thereto by passing the frame through a cooling-transfer part, wherein, in the act (c) of supplying the zipper to the extruding part, the zipper cloth is supplied while being sandwiched into the raw material injected to the extruding part by a shaping mold of the extruding part connected to the feeding mold and the extruding mold.

7. The method of claim 6, further comprising: after the act (e) of cooling the frame, (f) cutting the frame, which has passed through the cooling-transfer part, by a certain length.

8. The method of claim 6, wherein, in the act (d) of extruding the frame, the frame is extruded by the extruding part in a state in which the zipper cloth of the zipper is positioned inward of the raw material and the zipper is fixed to the frame.

* * * * *